United States Patent [19]
Müller

[11] 3,951,183
[45] Apr. 20, 1976

[54] FORMING TOOL FOR COIL-END COMPONENTS OF ELECTRIC MACHINES

[75] Inventor: Günter Müller, Birr, Switzerland

[73] Assignee: BBC Brown Boveri & Company Limited, Baden, Switzerland

[22] Filed: Dec. 27, 1974

[21] Appl. No.: 536,899

[30] Foreign Application Priority Data
Jan. 8, 1974  Switzerland............... 167/74

[52] U.S. Cl.................... 140/92.1; 269/45
[51] Int. Cl.² ........................... B21F 1/00
[58] Field of Search........ 29/209 D; 140/92.1; 269/45

[56] References Cited
UNITED STATES PATENTS

| | | | |
|---|---|---|---|
| 2,199,623 | 5/1940 | Elsey | 29/205 |
| 2,393,397 | 1/1946 | Mullarkey | 140/92.1 |
| 3,593,405 | 7/1971 | Hahn | 29/205 |
| 3,831,268 | 8/1974 | Boyd et al. | 29/205 |
| 3,841,133 | 10/1974 | Rice | 29/205 |
| 3,879,026 | 4/1975 | Lappin | 269/45 |

*Primary Examiner*—Lowell A. Larson
*Attorney, Agent, or Firm*—Pierce, Scheffler & Parker

[57] ABSTRACT

A forming tool for shaping coil-end conductor components of electric machines, especially for a headrest end-frame, which has an involute configuration and is composed of an assembly of releasably connected tapered ring-segments which have identical cone angles and a common axis. Adjustment in a direction tangential to the cone axis is provided to form an oblique conical segment.

5 Claims, 6 Drawing Figures

FORMING TOOL FOR COIL-END COMPONENTS OF ELECTRIC MACHINES

The present invention relates to an improvement in a forming tool for shaping coil-end conductor components of electric machines, especially for headrest end frames possessing a spatial involute shape.

Tools of this type which are utilized for the manufacture of conductors in turbo-generators, are known, as well as various methods to deal with problems arising in connection with such tools (book by H. Sequenz "Herstellung der Wicklungen elektischer-Maschinen," published in 1973 by Springer, showing a completely formed conductor in FIG. 27 on Page 76, a proper tool in FIG. 91 on Page 152, and discussing the significance of the involute dimensioning on Page 147, second paragraph).

Figure 1:
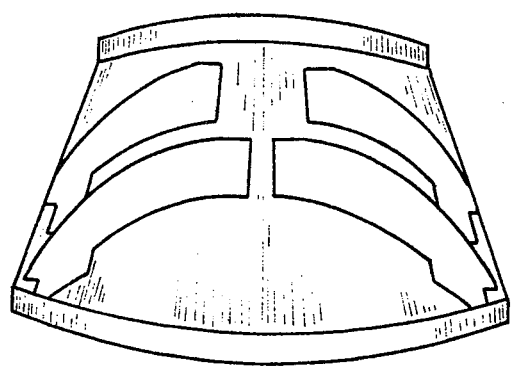

The shape of the headrest end frames for the conductors, at the present time usually built-up by use of several, individually twisted lattice rods, corresponds to an involute winding onto a cone because the involute will result in a geometrically equal spacing throughout the entire length of the end frame. The precise shaping of the coil-end components as well as the pressing of the individual partial conductors to accomplish blocking is carried out within basic forms equipped with conic segments. Heretofore, such conic segments had been cut from a truncated cone by milling, as illustrated by FIG. 1 which will be discussed below. Since a conic segment does not possess any large, plane contact surfaces, it was necessary to perform a number of operations, for example, the milling of the numerous grooves serving for the fastening of blocks and flexural heads, and the welding of reinforcing webs and junction plates, always at the solid truncated cone. Due to the large contact surfaces of the truncated cone, only relatively large-sized machine tools are usable for the lengthy machining operations. Even slight flaws in the form of the truncated cones, usually a result of rolling and lathe operations, will cause a rejection of the conical segment involved. Another serious disadvantage is the enormous storage requirement concerning such conical segments, whereby their reuse is very limited due to deformations after extended use which will lead to inaccuracies.

It is the primary object of the invention to provide a forming tool which can be universally used for any type of conductor shapes, even if they differ, among other criteria in internal stator diameter, projection and involute characteristics.

The invention solves this problem in that the tool possesses tapered ring segments which can be separated.

It is the main advantage of the invention that a simple, problem-free single part production of the tapered ring segments becomes feasible by the use of small-sized machine tools. Furthermore, the ring segments are interchangeable with ease, can always be re-used for new forms, and can be handled without any difficulty so far as transfer, shipping and storage are concerned. Also, they are extremely resistant to any change in shape, even after extended use, thus insuring the production of more precise involute end frames, leading to a reduction in the assembly time during the installation of the coil aggregates, as well as a reduction in the time needed for the unavoidable finishing work.

For the purpose of forming head-rest end frames, the tapered ring segments have preferably identical cone angles and a common cone axis. It will be advantageous to design the tapered ring segments — in accordance with involute shape of the headrest and frames — in such manner that they can be moved tangentially to the cone axis to form an oblique conical segment. In case of identical internal stator diameter and identical projection of the conductors it becomes thus possible to produce any desired involute at the tool.

It is further advantageous to dimension the tapered ring segments geometrically as well as strength-wise in such manner that the oblique conical segment can be readily increased (or decreased) in its slant height. If such expanded set of ring segment units is available, it becomes possible to form even conductors of maximum polar projection depth.

It is possible to attain a substantial saving in weight by beveling off the opposite ends of the ring segments without reducing the effective degree of arc.

For reasons of economics it is expedient to use ring segments of identical axial width and identical cross-section, thus making it possible to utilize a uniform base material, such as plate, for the manufacture of all ring segments. Furthermore, several ring segments can be machined simultaneously in the identical work mounting of a machine tool.

The accompanying drawings depict in simplified form, one example showing the present state of art, and one embodiment of the invention.

Figure 2:
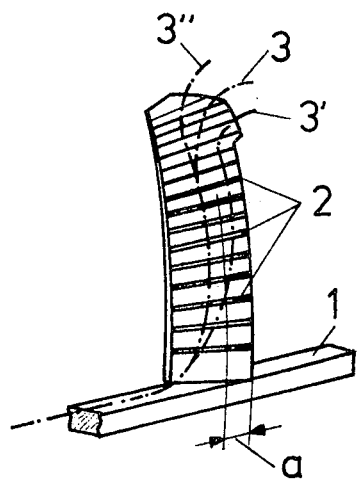
Figure 3:
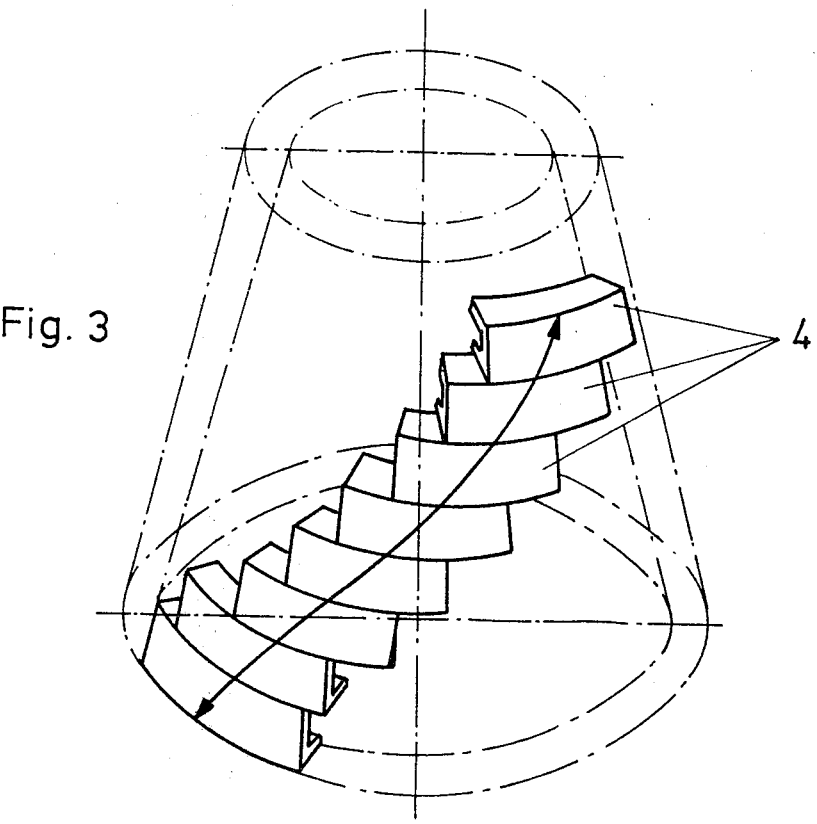
Figure 4:
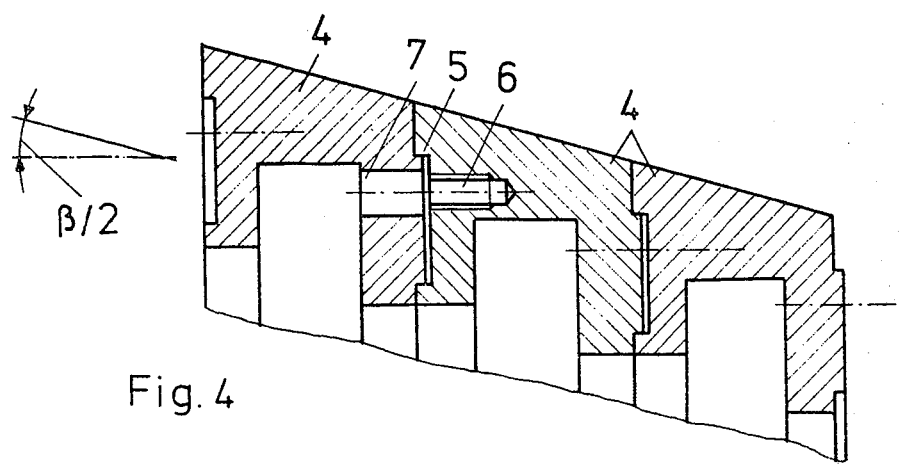
Figure 5:
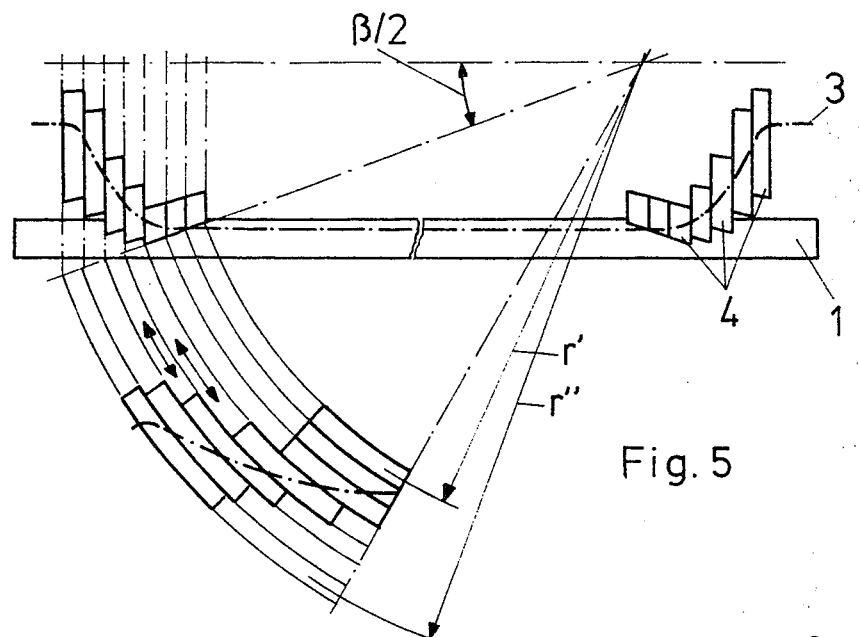
Figure 6:
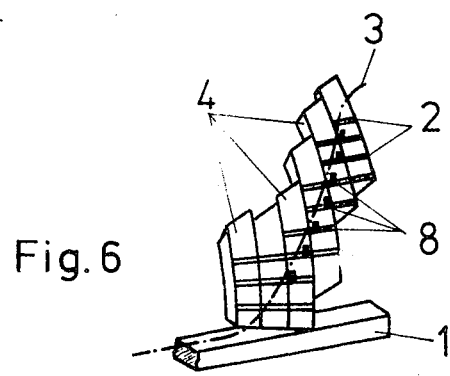

FIG. 1 depicts the manufacture of a conic segment as produced heretofore,

FIG. 2, provides a view in perspective of an installed conic segment according to FIG. 1, FIG. 3 illustrates the principle of the tapered ring segments, FIG. 4 is a part-sectioned view of several installed tapered ring segments, FIG. 5 illustrates the principle of a basic form with tapered ring segments, and FIG. 6 provides a view in perspective of a tool assembled in accordance with the invention.

All figures denote identical components by identical reference numerals.

The complete tool, the so-called basic form, consists essentially of a supporting beam, a left and a right conic segment — the two shaping components proper—, and various brackets carrying flexural heads. Any components not necessary for an explanation and understanding of the invention, for example, the brackets and the fluxural heads, are not included in the drawing.

FIG. 1, representing the present state of art, shows a truncated cone, produced by rolling and lathe operations which will furnish, at the most, eight conic segments, that is in view of the presently used two-layer windings, four segments each with identical polar radii. Thus, the eight conic segments permit only the production of four basic forms, namely, two forms each for the shaping of rods of the upper and of the bottom layer of the windings.

Experience in the manufacturing process has shown that it will be necessary to handle at least four rods in the same position simultaneously for a timely production of turbogenerators. It is therefore required to provide at least two crude cones per generator, the machining of which uses up time of often used, large-sized key machines of the work shop.

FIG. 2 shows a conic segment which has been installed after being machined from the truncated cone according to FIG. 1. Numeral 1 denotes the —only partially shown— supporting beam. The grooves 2 have a dovetail configuration and serve to guide the blocks and flexural heads, whereby the gage *a* is absolutely necessary. Numeral 3 denotes the center line of the —not illustrated— conductor rod. If the headrest end frame were to take the involute form according to 3', or such form with a still greater projection according to 3'', the tool would not be usuable any longer.

For a better understanding of the invention there is depicted in FIG. 3 an oblique conical segment built up by tapered ring segments 4. These ring segments 4 have a uniform width, uniform cross-sections as well as identical cone angles, for example 35°. That is, the forming tool for use in shaping conductor coil ends to an involute configuration is an assembly of progressively different diametered ring segments of a cone located side-by-side and which are interconnected to form the oblique conical segment. These geometric values are selected by means of critical methods in such manner that six tapered ring segments 4 must be installed together to form a conic segment similar to the segment shown by FIG. 2.

Therefore, for the simultaneous shaping of the abovementioned four rods of the upper, and the four rods of the bottom layer there are required a total of 96 tapered ring segments 4. Segments with identical, polar radii, machined from plate, can thus be worked within one and the same mounting, for example, in the case of the selected cone angle of 35° it will be possible to perform the forming operation simultaneously at ten ring segments 4 by use of a rotary lathe. The 96 tapered ring segments 4, ready for assembly into 16 conic segments, can furthermore very easily be stored on shelves, while the corresponding 16 conic segments, prepared in accordance with the known system, require large storage areas.

In order to permit the setting of any desired involute, the ring segments are designed in such manner that they can be moved tangentially relative to each other. As shown in FIG. 4, they are provided with an annularly running offset 5 to accomplish the centering. The releasable screw connection, which allows a shifting of the individual segments without disassembly, is accomplished by means of threaded holes 6 and the holes 7 which are elongated in peripheral direction. Due to their solid profile and the specific joining, the ring segments are free from any deformation even under maximum stress, and remain therefore true to mass and shape even after extended use.

FIG. 5 illustrates the principle of the basic form by way of a schematic top view and a projection into a plane of a conic segment. The conic angle $\beta$ as shown is, for example, 40°. The tangential of the individual ring segments 4 is accomplished in conformity with the involute to be formed. Any change in the projection range ($r'$, $r''$) of the coil-ends can be provided for simply by the addition, or removal, of ring segments.

FIG. 6 shows, analogous to FIG. 2, a tool consisting of six tapered ring segments 4 and mounted at the supporting beam 1. Into the grooves 2 there are placed stop pins 8 which serve to set the involute form by means of a template. The opposite ends of each of the three ring segments at the right side terminate in beveled surfaces. This is readily permissible because the involute has a closing characteristic; i.e. it will always enter, or exist respectively, at the acute-angled end face. There is attained not only the above-mentioned advantage of weight saving while still fully maintaining the effective degree of arc, but also an advantage in production: the beveled end faces of adjacent ring segments will interfit when mounted on a rotary face plate for machining. If, for example, the bevel amounts to 10 percent of the degree of arc, it becomes possible to mount an additional 10 percent of ring segments at the same time.

FIGS. 2 and 6 do not show the segment plates and brackets which serve to hold and fasten the tool to the supporting beam because these parts are not essential for the understanding of the invention. It should be mentioned, however, that in the case of the tool proposed by the invention these parts are likewise produced by employment of the unitized construction principle and are mounted by means of releasable screw connections.

The forming tool is operated in the same manner as the tool using conic segments of the present state of art. Into the basic form which carries one left and one right tool, there is inserted a conductor, pre-shaped at the coil ends, in order to give the headrest end frames their final form, the involute in the case of this invention. This is accomplished by means of flexural heads which are introduced into the grooves 2 and which operate mechanically, preferably hydraulically, or electrically.

Obviously, the invention is not limited to the specific example described above. It will be expedient to provide one unitized set of ring segments for all standard conic angles. It is also possible to use the tool proposed by the invention for the forming of cylindrical headrest end frames instead of end frames possessing an involute shape.

It is also possible, as a deviation to the drawing to use tapered ring segments of concave form in place of the convex form shown, to be used as control forms in place of the coil configuration previously used.

It is further obvious that the tool is not restricted to the shaping, but can serve also for baking, pressing and control.

I claim:

1. A forming tool for use in shaping coil conductor ends to an involute configuration comprising an assembly of progressively different diametered ring segments of a cone, and means correspondingly connecting said ring segments together side-by-side and in a releasable manner to establish an involute surface for shaping the conductor end to the same contour.

2. A forming tool for conductor-end shaping as defined in claim 1 wherein said means for interconnecting said ring segments together in a side-by-side manner provide for adjustment of each ring segment relative to an adjacent segment in a direction tangential of the cone axis thereby to provide differently oblique conical segments with correspondingly different involute characteristics.

3. A forming tool for conductor-end shaping as defined in claim 2 wherein said means for adjusting the interconnections between adjacent ring segments to provide differently oblique conical segments include a releasable screw extending through a circumferentially extending slot in one segment and threaded into a hole in an adjacent segment.

4. A forming tool for conductor end shaping as defined in claim 1 wherein the opposite ends of each of said ring segments terminate in beveled surfaces.

5. A forming tool for conductor-end shaping as defined in claim 1 wherein said ring segments have identical axial width and identical cross-section.

* * * * *